May 6, 1958     K. C. CUMMINGS     2,833,970
SELF CENTERING ALTITUDE CONTROLLER FOR AIRCRAFT
Filed July 13, 1953
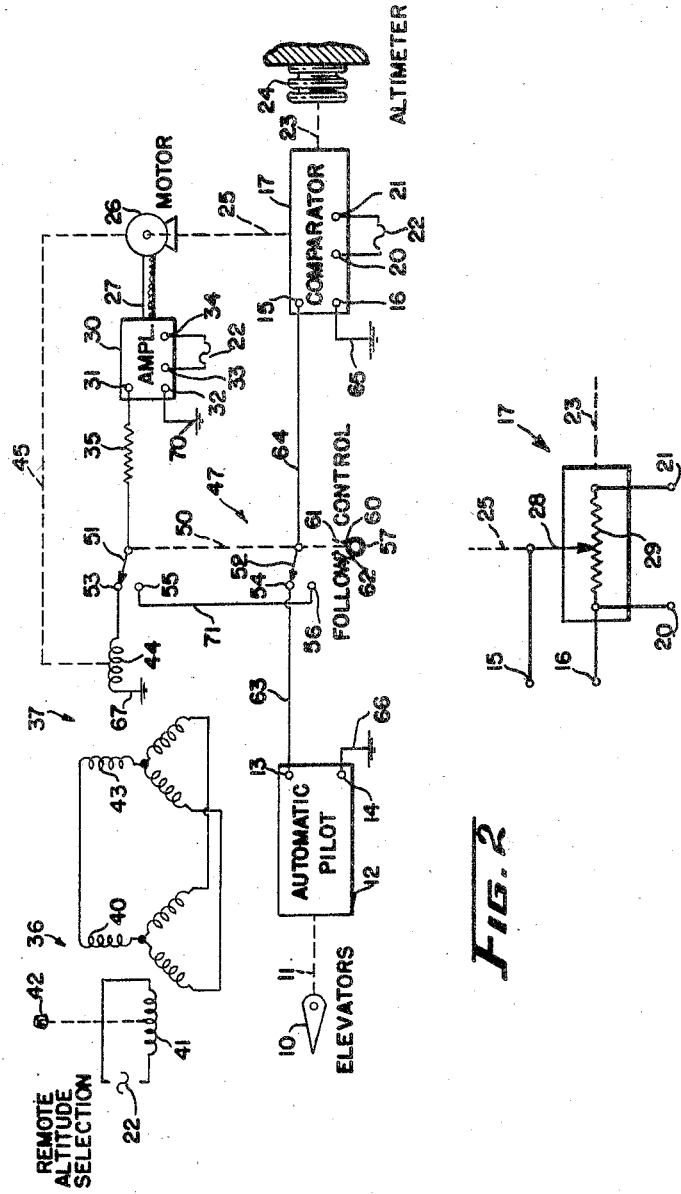
INVENTOR.
KIMBALL C. CUMMINGS
BY *George H Fisher*
ATTORNEY

United States Patent Office

2,833,970
Patented May 6, 1958

2,833,970

SELF CENTERING ALTITUDE CONTROLLER FOR AIRCRAFT

Kimball C. Cummings, Golden Valley, Minn., assignor to Minneapolis-Honeywell Regulator Company, Minneapolis, Minn., a corporation of Delaware Application July 13, 1953, Serial No. 367,515

8 Claims. (Cl. 318—28)

This invention relates to the general field of control apparatus, and more specifically to aircraft control apparatus operative about the pitch axis of a craft to regulate its altitude. A broad object of the invention is to provide an improved control system which normally adjusts a control member in accordance with the relation between actual and selected values of a condition, but which may be modified to adjust the selected value of the condition to agree with the actual value thereof.

More specifically it is an object of the invention to improve aircraft altitude controlling systems by providing means normally controlling the pitch attitude of a craft so that it flies at a selected altitude, the system including switching means for modifying its operation so that pitch attitude control is interrupted and an altitude selector is instead driven into agreement with an altitude sensor.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1 is a schematic showing of an altitude control system according to the invention, and Figure 2 is a schematic detail of a component of Figure 1.

The elevators of the craft are shown at 10 in Figure 1 as being driven through a mechanical connection 11 by an automatic pilot 12 having a pair of input terminals 13 and 14 at which it can be energized with the signal supplied at the output terminals 15 and 16 of a comparator 17 energized at terminals 20 and 21 with alternating voltage from a source 22. A first mechanical signal for comparator 17 is supplied through a connection 23 from an altitude responsive bellows 24, and a second mechanical signal for the comparator is supplied through a connection 25 from a motor 26. When the mechanical inputs are equal, no output appears at comparator terminals 15 and 16. When the inputs are not equal, an output derived from source 22 appears at terminals 15 and 16 of the comparator, the sense of the signal depending upon which of the mechanical inputs exceeds the other, and the magnitude of the signal depending on the degree of such excess.

One physical embodiment of comparator 17 is shown in Figure 2 to comprise a voltage divider having a slider 28 and a resistance winding 29 each of which is mounted for movement with respect to the other. Slider 28 is driven by mechanical connection 25, and winding 29 is driven by mechanical connection 23.

Motor 26 is energized through a cable 27 from an amplifier 30 having input terminals 31 and 32 and power terminals 33 and 34 which are connected to source 22. Amplifier 30 is energized through a resistor 35 to cause operation of motor 26.

The normal signal for amplifier 30 is derived from a telemetric system including a transmitter 36 and a receiver 37. Transmitter 36 is shown to comprise a three phase stator winding 40 and a single phase primary winding 41 arranged for a rotation with respect to the stator winding by actuation of a manual knob 42. Primary winding 41 is energized from source 22 as is shown, and the voltages induced in winding 40 are determined by the rotated position of rotor 41 with respect thereto. Similar voltages appear in the stator winding 43 of telemetric receiver 37, and a resultant voltage is induced in the primary winding or rotor 44 of the receiver. As is shown in the drawing, winding 44 is connected by a suitable mechanical connection 45 to be rotated by motor 26.

Operation of the apparatus takes place under the control of a switch 47 in which a mechanical connection 50 is arranged to actuate a pair of moveable contacts 51 and 52 out of normal engagement with a first pair of fixed contacts 53 and 54 and into engagement with a second pair of fixed contacts 55 and 56. Shaft 50 is extended to carry a knob 57: the knob is provided with an index 60 which is displaceable between alignment with a first index 61 and alignment with a second index 62 according as switch 47 is in its normal or its operated position.

A safety precaution normally taken in automatic pilots generally and present in automatic pilot 12 of the present application is means for limiting the extreme travel of elevators 10 in response to any signal which may come to the automatic pilot. This may be accomplished either by limit switches, which deenergize the motor means driving the elevators, or by a friction clutch cooperating with stop means so that the motor may continue in rotation but the operation of the elevators as a result thereof is interrupted.

*Operation*

It may be assumed that in the absence of signal on terminals 13 and 14, automatic pilot 12 operates elevators 10 in such a fashion as to maintain the craft in a normal pitch attitude: normal may here be defined as that pitch attitude which results in level flight.

The normal position of switch 47 is that shown in the drawing. In this position a circuit may be traced from terminal 13 of automatic pilot 12 through conductor 63, fixed contact 54 and moveable contact 52 of switch 47, conductor 64, terminals 15 and 16 of comparator 17 and ground connections 65 and 66 to terminal 14 of automatic pilot 12. A second circuit may be traced from input terminal 31 of amplifier 30 through resistor 35, moveable contact 51 and fixed contact 53 of switch 47, winding 44 of receiver 37, and ground connections 67 and 70 to terminal 32 of amplifier 30.

If rotors 41 and 44 of transmitter 36 and receiver 37 are similarly aligned with respect to their stator windings, no voltage is induced in primary winding 44 and the input to amplifier 30 is zero. Under these conditions no operation of motor 26 takes place and the mechanical input through connection 25 to comparator 17 is fixed. The mechanical input through connection 23 to the comparator is determined by the actual altitude of the aircraft, which remains constant since the craft is in level flight. If the two mechanical inputs to the comparator are equal, no output voltage appears at terminals 15 and 16, and no modification of the operation of automatic pilot 12 takes place. The apparatus is initially set up so that when the conditions just defined prevail, the selected altitude determined by knob 42 is the same as the actual altitude sensed by altimeter 24.

If the altitude of the craft changes, as by reason of vertical components of air motion for example, the input through connection 23 changes while the input through connection 25 remains constant, and a signal of a given sense appears at terminals 15 and 16 of comparator 17 and causes operation of automatic pilot 12 to change the pitch attitude of the craft. As a result of a new pitch attitude, the craft returns to the altitude from which it departed, altimeter 24 senses this change and restores the input through connection 23 to its former value, and the output from comparator 17 again becomes zero, allowing the elevators to be restored to their normal condition.

If it is desired to change the altitude at which the craft is flying, knob 42 is turned, displacing rotor winding 41 with respect to stator winding 40. By the familiar principles of synchro operation this changes the voltages in the several windings of stator 43, and a different voltage is induced in rotor winding 44 and is impressed on the input to amplifier 30. Operation of motor 26 follows to adjust rotor 44 into a new position in which the voltage induced therein is zero, and at the same time input 25 to comparator 17 is also changed. The actual altitude of the craft has not yet changed, however, so a difference output appears between terminals 15 and 16 of comparator 17 and causes operation of automatic pilot 12 to once more adjust elevators 10. The new pitch attitude of the aircraft resulting from this operation causes the craft to begin to change altitude, and if the change called for is relatively small, and if the operation of the motor in automatic pilot 12 which adjusts elevators 10 is relatively slow, it may be that the craft will have achieved a new altitude before operation of the automatic pilot to engage one of the stops has taken place. However, it is ordinarily the case that relatively large changes in altitude are called for by means of knob 42, so that in general when a change in altitude is called for elevators 10 are moved promptly to the full excursion possible by use of automatic pilot 12, and the resulting pitch attitude is maintained until the new altitude is finally reached. While this is taking place, input 23 from altimeter 24 is changing, reducing the signal from comparator 17. When the new altitude is finally achieved mechanical inputs 23 and 25 are once more equal and the elevators are restored to their former position, so that level flight of the craft again results.

Level flight of the craft is not always desired, and means must therefore be provided to permit flight at other than a constant altitude, and to establish a normal condition of the altitude control apparatus so that when level flight is once more desired, the same can be accomplished with relatively little difficulty. This is the purpose of switch 47, whose contacts 55 and 56 are connected by a conductor 71. When it is desired to turn off the altitude control system, knob 57 is rotated from its control to its follow position, that is, point 60 is displaced from alignment with index 61 to alignment with index 62. Automatic pilot 12 is now cut off at contact 54 from connection with comparator 17, and similarly the selecting system including transmitter 36 and receiver 37 is cut off at terminal 53 from amplifier 30. A new connection is also made from terminal 15 of comparator 17 through conductor 64, moveable contact 52 and fixed contact 56 of switch 47, conductor 71, fixed contact 55 and moveable contact 51 of switch 47, and resistor 35 to input terminal 31 of amplifier 30, the circuit being completed through ground connections 70 and 65. As a result of this new connection, motor 26 is energized to operate in accordance with any disagreement between the mechanical input on connection 25 and that on connection 23, reducing that disagreement to zero. Thereafter as the altitude of the craft changes, changing the input on connection 23, operation of motor 26 ensues to change the input on connection 25, so that the output of comparator 17 is maintained below the threshold level of amplifier 30.

It will be evident that although the output of the comparator is essentially maintained at zero, and although the input on connection 25 is maintained equal to that on connection 23, the actual selected altitude as determined by knob 42 has not been changed. Rotor 44 of receiver 37 on the other hand is continuously positioned in accordance with the actual altitude of the craft, so that when altitude control is once more desired and switch 47 is thrown into its control position, the voltage across rotor 44, which has continuously been representative of the displacement of that rotor from alignment with rotor 41, is applied to amplifier 30 and immediate correction of the craft's present altitude toward the selected value is initiated.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. Apparatus of the class described, comprising, in combination: control means adjusting the elevators of a craft in accordance with an electrical signal; comparing means giving a first electrical signal determined by two mechanical inputs; altitude responsive means connected to supply a first mechanical input to said comparing means which is a measure of the actual altitude of the craft; motor means connected to supply a second mechanical input to said comparing means; selecting means supplying a second electrical signal the magnitude of which is a measure of the desired altitude of the craft; motor control means for causing operation of said motor means in proportion to an electrical signal; means normally interconnecting said elevator adjusting control means, said comparing means, said altitude responsive means, said motor means, said selecting means, and said motor control means so that said first electrical signal is supplied to said control means and so that said second electrical signal is supplied to said motor control means; and means in said interconnecting means operable to disconnect said selecting means and said control means and to supply said first electrical signal to said motor control means.

2. Aircraft control apparatus comprising, in combination: control means adjusting the pitch attitude of the craft to change its altitude; selecting means giving a signal the magnitude of which varies as a measure of the selected altitude of the craft; comparing means for giving an output which is a measure of the difference between a pair of inputs; altitude responsive means connected to said comparing means to supply a first input thereto; motor means connected to said comparing means to supply a second input thereto; interconnecting means normally connecting said selecting means in controlling relation to said motor means, and connecting said control means in controlled relation to said comparing means, so that the aircraft is brought to the selected altitude; and means in said interconnecting means operable to disconnect said selecting means from said motor means, to disconnect said control means from said comparing means, and to connect said output in controlling relation to said motor means, so that said second input is made equal to said first input.

3. Aircraft altitude control apparatus having a control condition, in which the craft is brought to and maintained at a selected altitude, and a follow condition, in which a signal is developed as a function of the actual altitude, comprising in combination: comparing means giving a first electrical signal determined by a pair of inputs; altitude responsive means giving a first input to said comparing means; motor means giving a second input to said comparing means in accordance with an electrical signal supplied thereto; selecting means giving a second electrical signal the magnitude of which is representative of a desired altitude for the craft; control means adjusting the pitch attitude of the craft in accordance with an electrical signal supplied thereto; circuit means normally interconnecting said comparing means, said altitude responsive means, said motor means, said selecting means, and said control means so as to supply said first electrical signal to said control means and said second electrical signal to said motor means; and means altering said circuit means to disconnect said selecting means and said control means and to supply said first electrical signal to said motor means.

4. Aircraft altitude control apparatus comprising, in combination: control means adjusting the pitch attitude of a craft in accordance with a signal; comparing means giving a first signal in accordance with an altitude responsive input and a motor adjusted input; motor control means connected to said comparing means for causing operation of the motor thereof in accordance with a signal; means supplying a second signal the magnitude of which is representative of a desired altitude for the craft; and switching means connected to said control means, said comparing means, said motor control means, and said selecting means, and adjustable between a first condition, in which said first signal is supplied to said control means and said second signal is supplied to said motor control means, and a second condition, in which said first signal is supplied to said motor control means and said selecting means and said control means are isolated.

5. Apparatus of the class described comprising, in combination: selecting means including signal producing means adjustable to give a signal the magnitude of which is representative of a desired altitude for an aircraft; responsive means giving a signal representative of the actual altitude of the craft; interconnecting means; control means connected to said selecting and responsive means by said interconnecting means for normally controlling the pitch attitude of the craft in accordance with said signals; and means in said interconnecting means operable to interrupt control of the pitch attitude of the craft and substitute adjustment of said signal producing means of said selecting means into agreement with said responsive means.

6. Control apparatus comprising, in combination: selecting means including signal producing means giving a signal the magnitude of which is representative of a desired value of a condition; responsive means giving a signal representative of the actual value of the condition; control means; interconnecting means normally connecting said selecting means and said responsive means to said control means for causing operation thereof determined by said signals; and means included in said interconnecting means operable to prevent operation of said control means by said signals of said selecting means and said responsive means and to cause operation of said signal producing means of said selecting means into agreement with said responsive means.

7. Apparatus of the class described, comprising, in combination: control means performing a function in accordance with an electrical signal; comparing means giving a first electrical signal determined by two mechanical inputs; condition responsive means connected to supply a first mechanical input to said comparing means which is a measure of the actual value of a condition; motor means connected to supply a second mechanical input to said comparing means; selecting means supplying a second electrical signal the magnitude of which is a measure of the desired value of the condition; motor control means for causing operation of said motor means in proportion to an electrical signal; interconnecting means normally interconnecting the above named means so that said first electrical signal is supplied to said control means and so that said second electrical signal is supplied to said motor control means; and means in said interconnecting means operable to disconnect said selecting means and said control means and to supply said first electrical signal to said motor control means.

8. Control apparatus comprising, in combination: control means adjustable within a range of adjustment; selecting means giving a signal the magnitude of which varies as a measure of a selected value of a condition; comparing means for giving an output which is a measure of the difference between a pair of inputs; condition responsive means connected to said comparing means to supply a first input thereto; motor means connected to said comparing means to supply a second input thereto; interconnecting means normally connecting said selecting means in controlling relation to said motor means, and connecting said control means in controlled relation to said comparing means, so that the control means is brought to an adjusted condition determined by said output; and means in said interconnecting means operable to disconnect said selecting means from said motor means, to disconnect said control means from said comparing means, and to connect said output in controlling relation to said motor means, so that said second input is made equal to said first input.

References Cited in the file of this patent

UNITED STATES PATENTS

| | | |
|---|---|---|
| 2,415,429 | Kellogg et al. | Feb. 11, 1947 |
| 2,512,902 | Rossire | Jan. 27, 1950 |